United States Patent
Wu et al.

(10) Patent No.: US 11,945,156 B2
(45) Date of Patent: Apr. 2, 2024

(54) PLATE SEPARATING FROM SUPPORT FILM FOR VAT PHOTO-POLYMERIZATION

(71) Applicant: Young Optics Inc., Hsinchu (TW)

(72) Inventors: Li-Han Wu, Hsinchu (TW);
Chien-Hsing Tsai, Hsinchu (TW);
Chao-Shun Chen, Hsinchu (TW);
Tsung-Yu Liu, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 798 days.

(21) Appl. No.: 16/693,626

(22) Filed: Nov. 25, 2019

(65) Prior Publication Data

US 2020/0086626 A1 Mar. 19, 2020

Related U.S. Application Data

(63) Continuation of application No. 15/250,153, filed on Aug. 29, 2016, now abandoned, which is a (Continued)

(30) Foreign Application Priority Data

Dec. 29, 2015 (TW) .................. 104144282

(51) Int. Cl.
*B29C 64/129* (2017.01)
*B29C 64/245* (2017.01)
(Continued)

(52) U.S. Cl.
CPC .......... *B29C 64/129* (2017.08); *B29C 64/245* (2017.08); *B29C 64/255* (2017.08); *B33Y 10/00* (2014.12); *B33Y 30/00* (2014.12)

(58) Field of Classification Search
CPC ....... B33Y 10/00; B29C 64/20; B29C 64/129; B29C 64/00
See application file for complete search history.

(56) References Cited

U.S. PATENT DOCUMENTS 8,372,330 B2 * 2/2013 El-Siblani ............... B29C 64/40
264/316
9,452,567 B2 * 9/2016 Syao ..................... B29C 64/124
(Continued)

FOREIGN PATENT DOCUMENTS

JP 06246838 A * 9/1994 ........... B29C 64/135

OTHER PUBLICATIONS

Machine translation of JP-06246838-A (Year: 1994).*

Primary Examiner — Xiao S Zhao
Assistant Examiner — Nicholas J Chidiac
(74) Attorney, Agent, or Firm — Muncy, Geissler, Olds & Lowe, P.C.

(57) ABSTRACT

A three-dimensional printing apparatus includes a liquid tank capable of accommodating a photosensitive liquid. The liquid tank includes a film, a plurality of side walls, a plate and a motor. The film has a workpiece curing area. The plurality of side walls surrounds the film. The plate is capable of supporting the film and having at least one fluid tunnel extending from a first surface of the plate contacting the film to a second surface of the plate. The motor is connected to the liquid tank to incline the liquid tank. A gap is formed between the plat and one of the plurality of side walls of the liquid tank, and the film is communicated with an outside space via the gap.

20 Claims, 15 Drawing Sheets

Related U.S. Application Data continuation-in-part of application No. 15/014,811, filed on Feb. 3, 2016, now Pat. No. 11,498,265.

(51) Int. Cl.
*B29C 64/255* (2017.01)
*B33Y 10/00* (2015.01)
*B33Y 30/00* (2015.01)

(56) References Cited

U.S. PATENT DOCUMENTS

| | | | | |
|---|---|---|---|---|
| 9,802,361 | B2 * | 10/2017 | Elsey | B33Y 10/00 |
| 10,118,377 | B2 * | 11/2018 | Castanon | B29C 64/245 |
| 10,201,963 | B2 * | 2/2019 | Thomas | B29C 64/135 |
| 10,213,966 | B2 * | 2/2019 | FrantzDale | B29C 64/20 |
| 10,369,747 | B2 * | 8/2019 | Lobovsky | B29C 64/135 |
| 10,882,247 | B2 * | 1/2021 | Van Esbroeck | B29C 64/255 |
| 10,926,457 | B2 * | 2/2021 | Lobovsky | B29C 64/135 |
| 11,673,326 | B2 * | 6/2023 | Tsai | B29C 64/223 425/174 |
| 11,701,825 | B2 * | 7/2023 | Tseng | B33Y 10/00 425/174.4 |
| 2011/0089610 | A1 * | 4/2011 | El-Siblani | B29C 64/245 425/89 |
| 2014/0191442 | A1 * | 7/2014 | Elsey | B33Y 30/00 264/401 |
| 2015/0064298 | A1 * | 3/2015 | Syao | B29C 64/124 425/169 |
| 2016/0046080 | A1 * | 2/2016 | Thomas | B29C 64/379 425/165 |
| 2016/0052205 | A1 * | 2/2016 | FrantzDale | B29C 64/255 264/401 |
| 2017/0129167 | A1 * | 5/2017 | Castanon | G03F 7/0037 |
| 2018/0029296 | A1 * | 2/2018 | Van Esbroeck | B29C 64/286 |
| 2018/0133973 | A1 * | 5/2018 | Lobovsky | B29C 64/245 |
| 2019/0322053 | A1 * | 10/2019 | Lobovsky | B29C 64/255 |
| 2020/0298485 | A1 * | 9/2020 | Tsai | B29C 64/245 |
| 2021/0197464 | A1 * | 7/2021 | Tseng | B33Y 10/00 |

\* cited by examiner

PLATE SEPARATING FROM SUPPORT FILM FOR VAT PHOTO-POLYMERIZATION

CROSS-REFERENCE TO RELATED APPLICATIONS

The present application is a continuation application claiming benefit from parent US Patent Application bearing a Ser. No. 15/250,153 and filed Aug. 29, 2016, which claiming benefit from a parent US Patent Application bearing a Ser. No. 15/014,811 and filed Feb. 3, 2016, contents of which are incorporated herein for reference.

FIELD OF THE INVENTION

The present invention relates to a printing apparatus, and more particularly to an apparatus and method for three-dimensional printing.

BACKGROUND OF THE INVENTION

In conventional light curing three-dimensional printing devices, a film and a plate for supporting the film are disposed on the bottom of a tank for accommodating photosensitive resins. In printing of a workpiece, the photosensitive resins would be cured to form a layer of the workpiece and adhere to the film. To initiate printing of the following layer, applying a force to lift up the workpiece is required to separate the workpiece from the film and allow uncured photosensitive resins to fill between the workpiece and the film. However, in conventional three-dimensional printing devices, the space between the film and the plate becomes airtight during printing of a workpiece and low-pressure/vacuum builds up therewithin during releasing of the resulting workpiece, therefore causing difficulties in separating the workpiece from the film.

While increasing the uplift force may be helpful in separating the workpiece from the film, application of strong uplift forces often leads to damage of the workpiece and deformation of the film.

BRIEF SUMMARY OF THE INVENTION

An embodiment of the present invention provides a three-dimensional printing apparatus for facilitating the separation of workpieces from the film.

A three-dimensional printing apparatus according to an embodiment of the present invention includes a liquid tank capable of accommodating a photosensitive liquid. The liquid tank includes a film, a plurality of side walls, a plate and a motor. The film has a workpiece curing area. The plurality of side walls surrounds the film. The plate is capable of supporting the film and having at least one fluid tunnel extending from a first surface of the plate contacting the film to a second surface of the plate, wherein the plate is not flexible. The motor is connected to the liquid tank to incline the liquid tank. A gap is formed between the plat and one of the plurality of side walls of the liquid tank, and the film is communicated with an outside space via the gap.

A three-dimensional printing apparatus according to an embodiment of the present invention includes a liquid tank and a light source device. The liquid tank includes a film, a plate and a motor. The film covers entire of the opening of the liquid tank and having a central area including a workpiece curing area and an outer area surrounding the central area. The plate is capable of supporting the film and having at least one fluid tunnel extending from a first surface of the plate contacting the film to a second surface of the plate. The motor is connected to the liquid tank to incline the liquid tank. The light source device is disposed below the liquid tank and capable of providing a curing light beam passing through the plate and irradiating the workpiece curing area.

An embodiment of the present invention utilizes the fluid tunnel(s) disposed on the plate, the lifting device(s) for lifting the film, or the motor for inclining a workpiece and the plate with each other to balance the pressure along the two sides of the film, thus eliminating the low-pressure/vacuum built between the film and the plate. An embodiment of the present invention facilitates the separation of workpieces from the film, avoiding workpiece damages and film deformation, as well as improving the speed and stability of three-dimensional printing.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
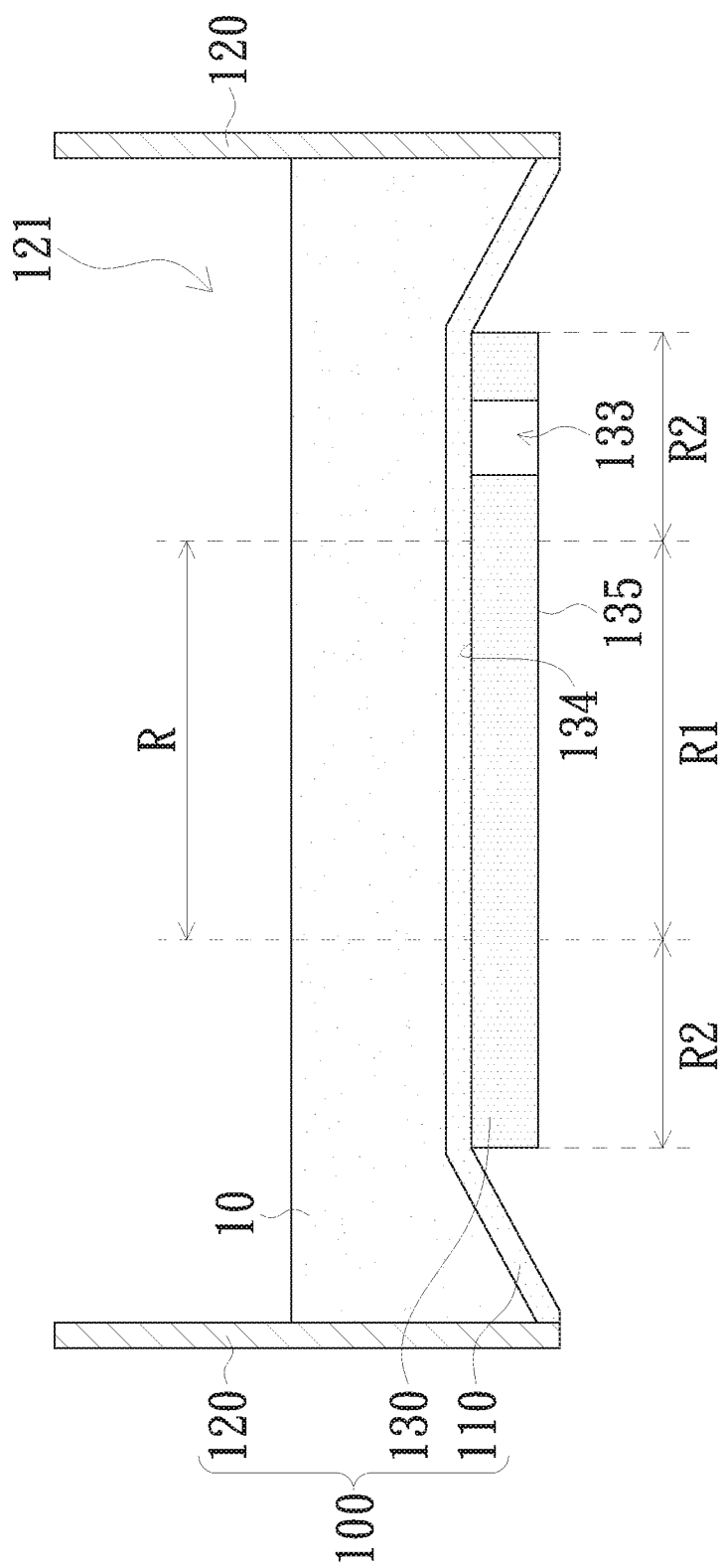
FIG. 1 is a schematic illustration of a liquid tank according to an embodiment of the present invention.

Referring now to FIG. 1. A liquid tank 100 of the present embodiment is applicable to a three-dimensional printing apparatus, and is configured to accommodate a photosensitive liquid 10. The liquid tank 100 includes a film (a release layer) 110 and a plate 130. The film 110 has a working area (a workpiece curing area) R, onto which a curing light beam provided by the three-dimensional printing apparatus irradiates. The plate 130 supports the film 110, and has a first area R1 corresponding to the working area R and a second area R2 adjacent to the first area R1. The second area R2 has at least one fluid tunnel (fluid passage) 133 extending from a surface 134 of the plate 130 contacting the film 110 to another surface of the plate 130; for example, a surface 135 opposite to the surface 134. In another embodiment of the present invention, the fluid tunnel 133 is located in the first area R1.

The liquid tank 100 may include a plurality of side walls 120 surrounding the film 110. An accommodating space 121 is formed between the side walls 120 and the film 110 for accommodating the photosensitive liquid 10. Additionally, the film 110 is a flexible film made of soft materials, and is light transmissive. The film 110 may also be weakly adhesive to surfaces; more specifically, the film 110 may, but is not limited to, be made of silicone or polytetrafluoroethylene.

The second area R2 of the plate 130 surrounds the first area R1. In another embodiment, the second area R2 may be disposed on a side of the first area R1. Moreover, the second area R2 in this embodiment includes one fluid tunnel 133; in other embodiments, the second area R2 may include a plurality of fluid tunnels 133. Furthermore, the plate 130 may be made of glass, plastics, acrylates, or other materials capable of providing sufficient support. The plate 130 may also be light transmissive. The fluid tunnel 133 linearly extends from the surface 134 of the plate 130 to the surface 135 opposite to the surface 134.

Figure 2A:
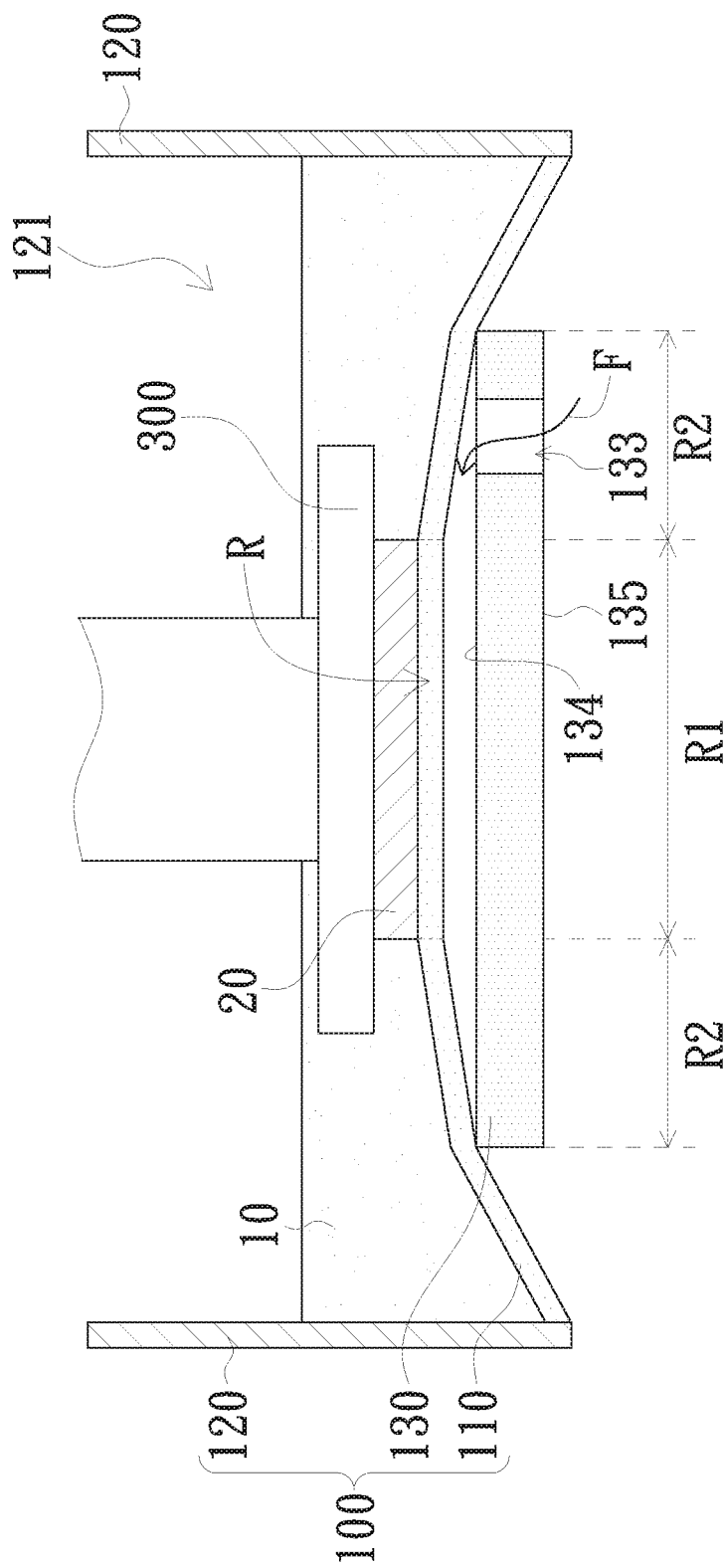
FIG. 2A is a schematic illustration of a workpiece separating from a film of the liquid tank of FIG. 1.

Referring now to FIG. 2A. The photosensitive liquid 10 is cured in the working area R to form a workpiece 20 adhered (attached) to a platform (curing platform) 300 of the three-dimensional printing apparatus. Thereafter, uplift of the workpiece 20 by the platform 300 allows fluid F to flow through the fluid tunnel 133 and enter the space between the film 110 and the surface 134 of the plate 130, therefore eliminating low-pressure/vacuum (low-pressure vacuum) built up between the film 110 and the plate 130 and balancing the pressure along the two sides of the film 110. The workpiece 20 may be easily separated from the film 110 by applying an uplift force that is greater than only the adhesive force between the workpiece 20 and the film 110, allowing the photosensitive liquid 10 to fill between the workpiece 20 and the film 110 so as to initiate printing of the following layer. Consequently, the liquid tank 100 of the present embodiment greatly reduces the uplift force required to separate the workpiece 20 from the film 110, and thus damage of the workpiece 20 or deformation of the film 110 can be avoided.

Figure 2B:
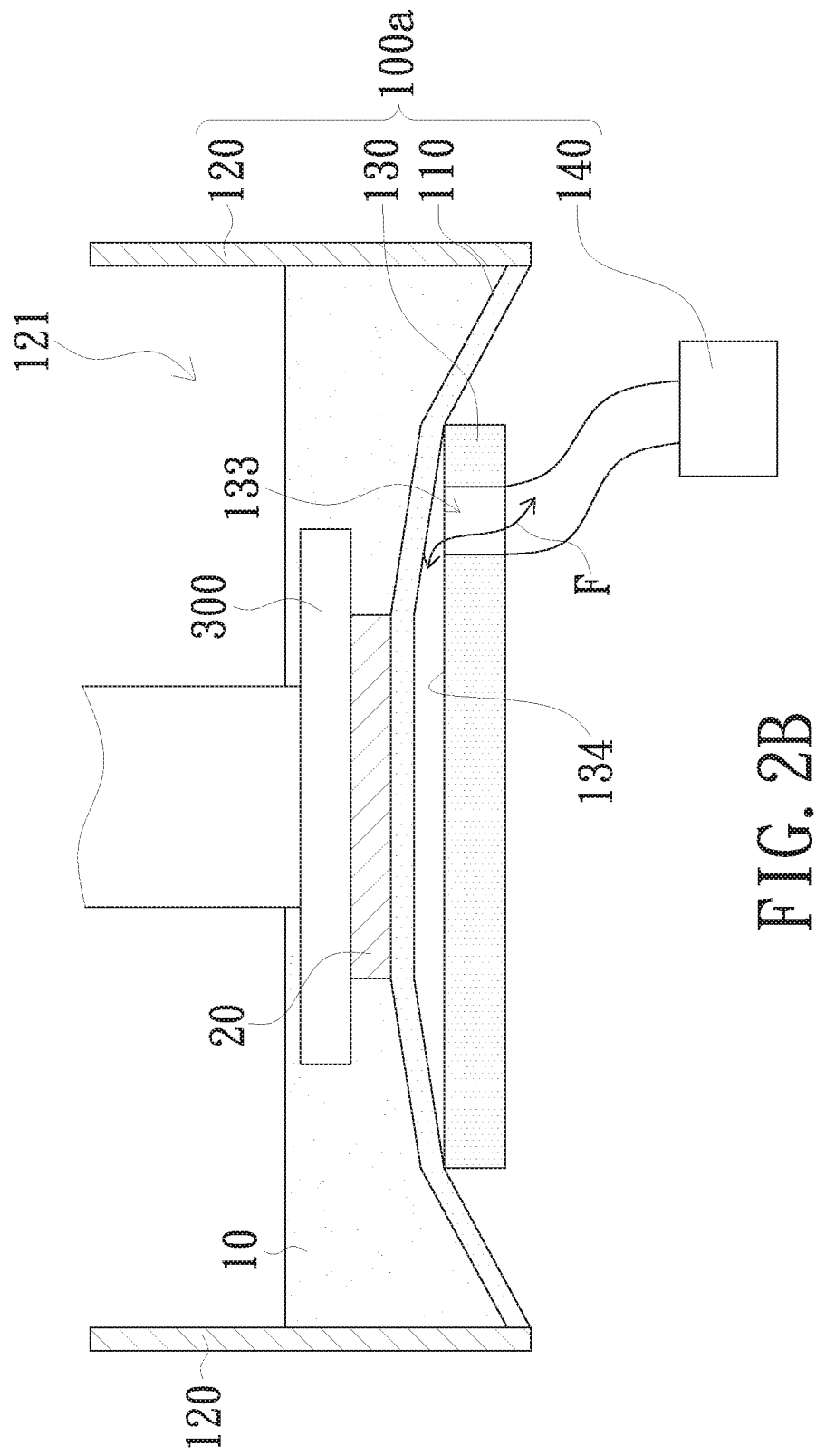
FIG. 2B is a schematic illustration of a workpiece separating from a film of a liquid tank according to another embodiment of the present invention.

Referring now to FIG. 2B. In another embodiment, the liquid tank 100a further includes a fluid driver 140, e.g. a pumper, connecting to the fluid tunnel 133 for driving the fluid F to flow through the fluid tunnel 133. More specifically, after formation of each layer of the workpiece 20, fluid driver 140 would drive the fluid F to flow through the fluid tunnel 133 and enter the space between the film 110 and the surface 134 of the plate 130; in this way, low-pressure/vacuum built up between the film 110 and the plate 130 is eliminated and pressure along the two sides of the film 110 is balanced, therefore facilitating the separation of workpiece 20 from the film 110. Thereafter, the fluid driver 140 would clear the fluid F out from the space between the film 110 and the surface 134 of the plate 130 via the fluid tunnel 133, allowing the film 110 to sit smoothly over the plate 130 and ensuring precision of the following printings by preventing residual fluid F to remain between the film 110 and the surface 134 of the plate 130. The fluid F may be gas, such as air, nitrogen, or other types of gas commonly used in manufacturing and processing. The fluid F may also be liquid, such as water.

Figure 3A:
FIGS. 3A and 3B are schematic illustrations of plates according to yet another two embodiments of the present invention.
Figure 3B:
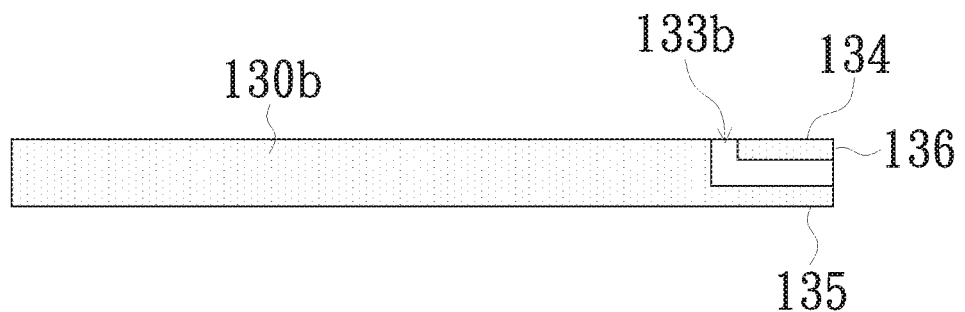

In other embodiments as illustrated in FIGS. 3A and 3B, a fluid tunnel 133a may non-linearly or meanderingly extend from the surface 134 of the plate 130a to the surface 135 opposite to the surface 134. A fluid tunnel 133b may also extend from the surface 134 of the plate 130b to the surface 136 adjacent to the surface 134.

Figure 4:
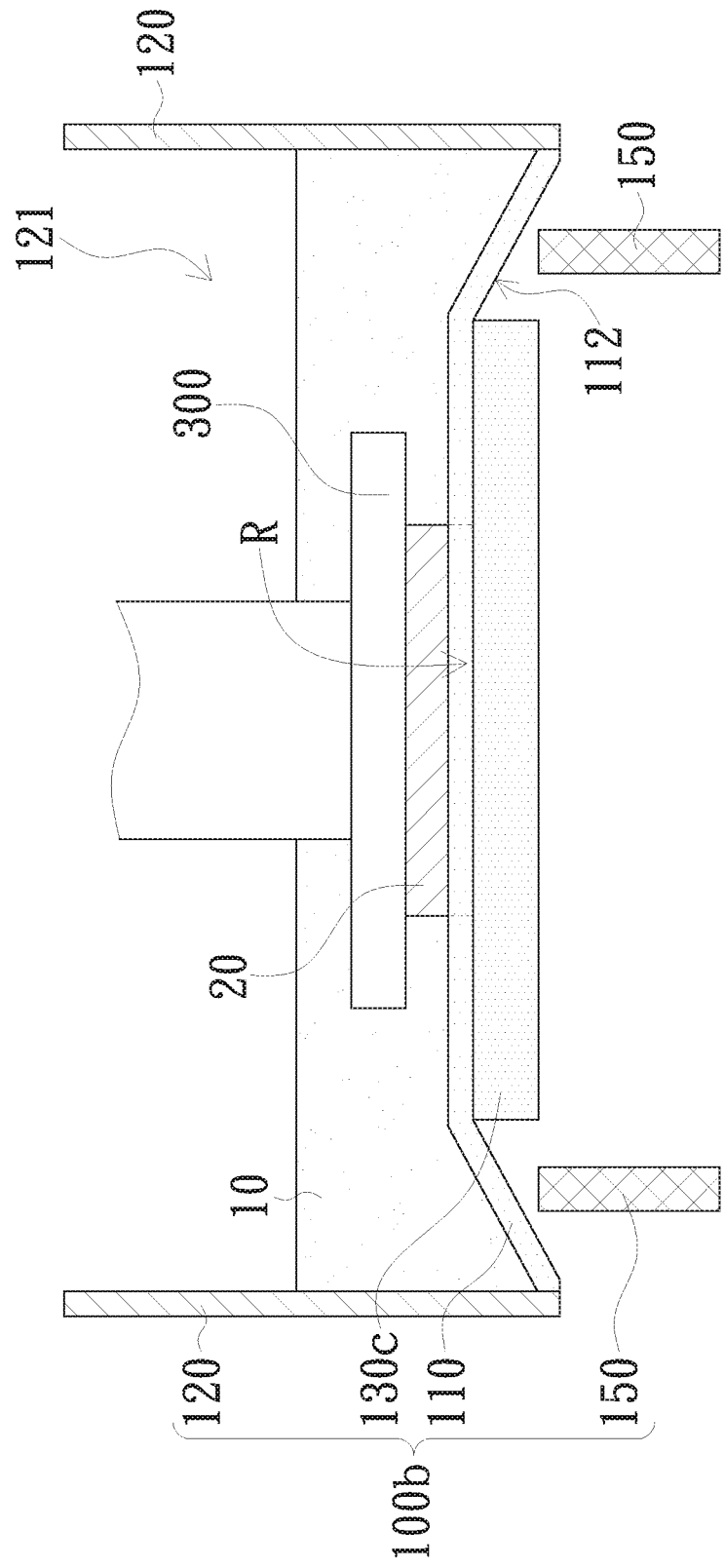
FIG. 4 is a schematic illustration of a liquid tank according to another embodiment of the present invention.

Referring now to FIG. 4. Another embodiment of the present invention provides a liquid tank 100b applicable to a three-dimensional printing apparatus. The liquid tank 100b is configured for accommodating a photosensitive liquid 10, and includes a film 110, a plate 130c, and at least one lifting device 150. The liquid tank 100b may further include a plurality of side walls 120. The film 110 and the side walls 120 of the present embodiment are structurally similar to those of the aforementioned embodiments; redundant details thereof are thus not repeatedly provided herein. The liquid tank 100b of the present embodiment is different from the liquid tank 100 of the aforementioned embodiments mainly in that the plate 130c supporting the surface 112 of the film 110 does not include a fluid tunnel and that the at least one lifting device 150 is disposed adjacent to the plate 130c and props against the surface 112. The at least one lifting device 150 is configured for lifting the film 110 so as to separate at least a portion of the film 110 from the plate 130c.

Taking the embodiment illustrated in FIG. 4 for example, two lifting devices 150 may be symmetrically disposed on two sides of the plate 130c. In other embodiments, one lifting device 150 may be disposed on one side of the plate 130c (not shown in figure), or a plurality of lifting devices 150 may surround or encircling around the plate 130c (not shown in figure); the present invention is not limited thereto however.

Figure 5:
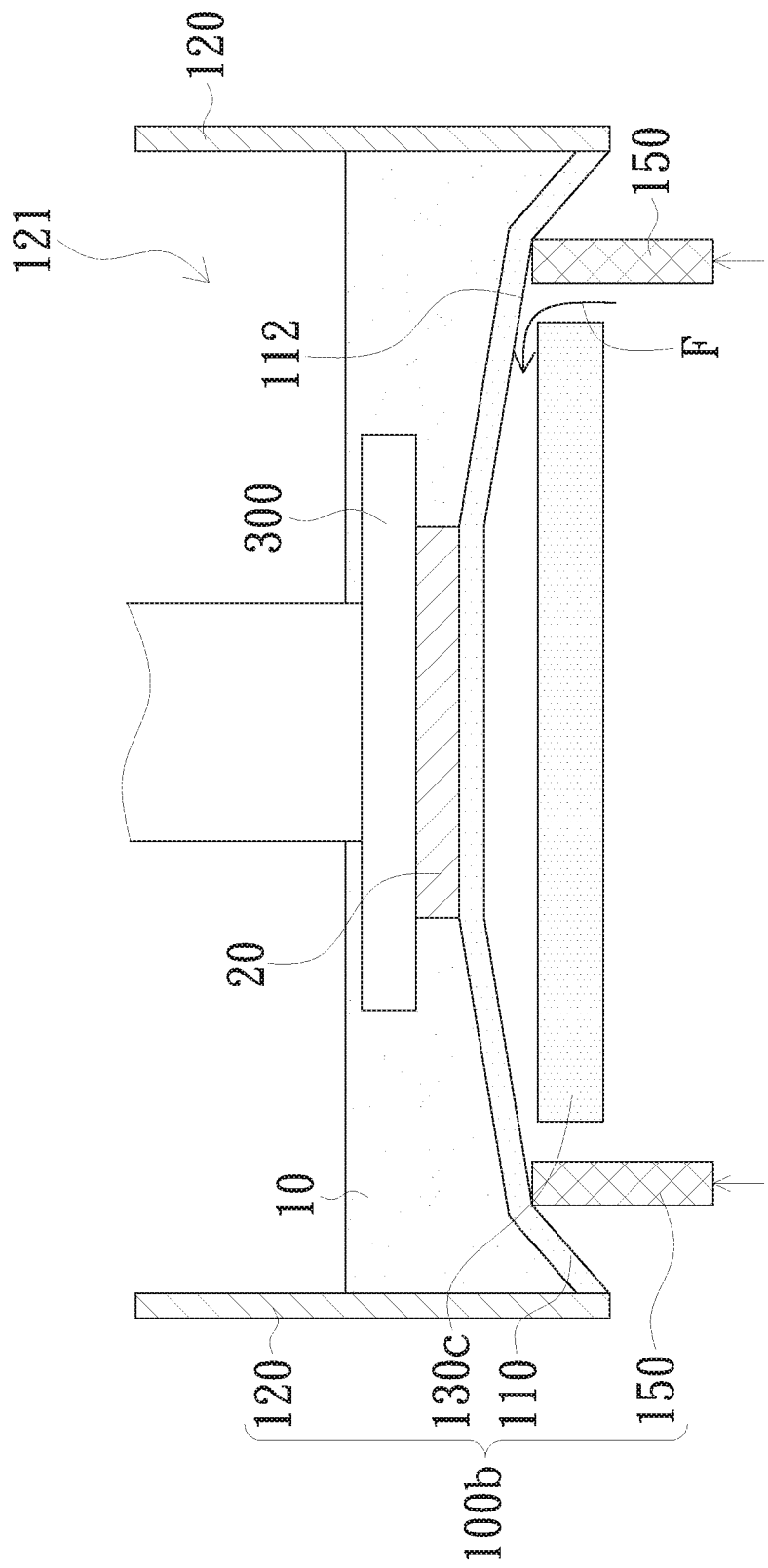
FIG. 5 is a schematic illustration of the actuation of the embodiment according to FIG. 4.

Referring now to FIG. 5. After the photosensitive liquid 10 is cured to form a workpiece 20, the lifting device 150 shifts upward and lifts the film 110 by propping against the surface 112, therefore separating the film 110 from the plate 130c and allowing the fluid F to enter the space between plate 130c and surface 112 of the film 110. Consequently, low-pressure/vacuum built up between the film 110 and the plate 130c is eliminated and pressure along the two sides of the film 110 is balanced, thus effectively reducing the uplift force required to separate the workpiece 20 and the film 110 and preventing damage of the workpiece 20 or deformation of the film 110. Furthermore, the lifting device 150 may be adopted in any of the aforementioned embodiments in which at least one liquid passage is present in the plate.

Figure 6:
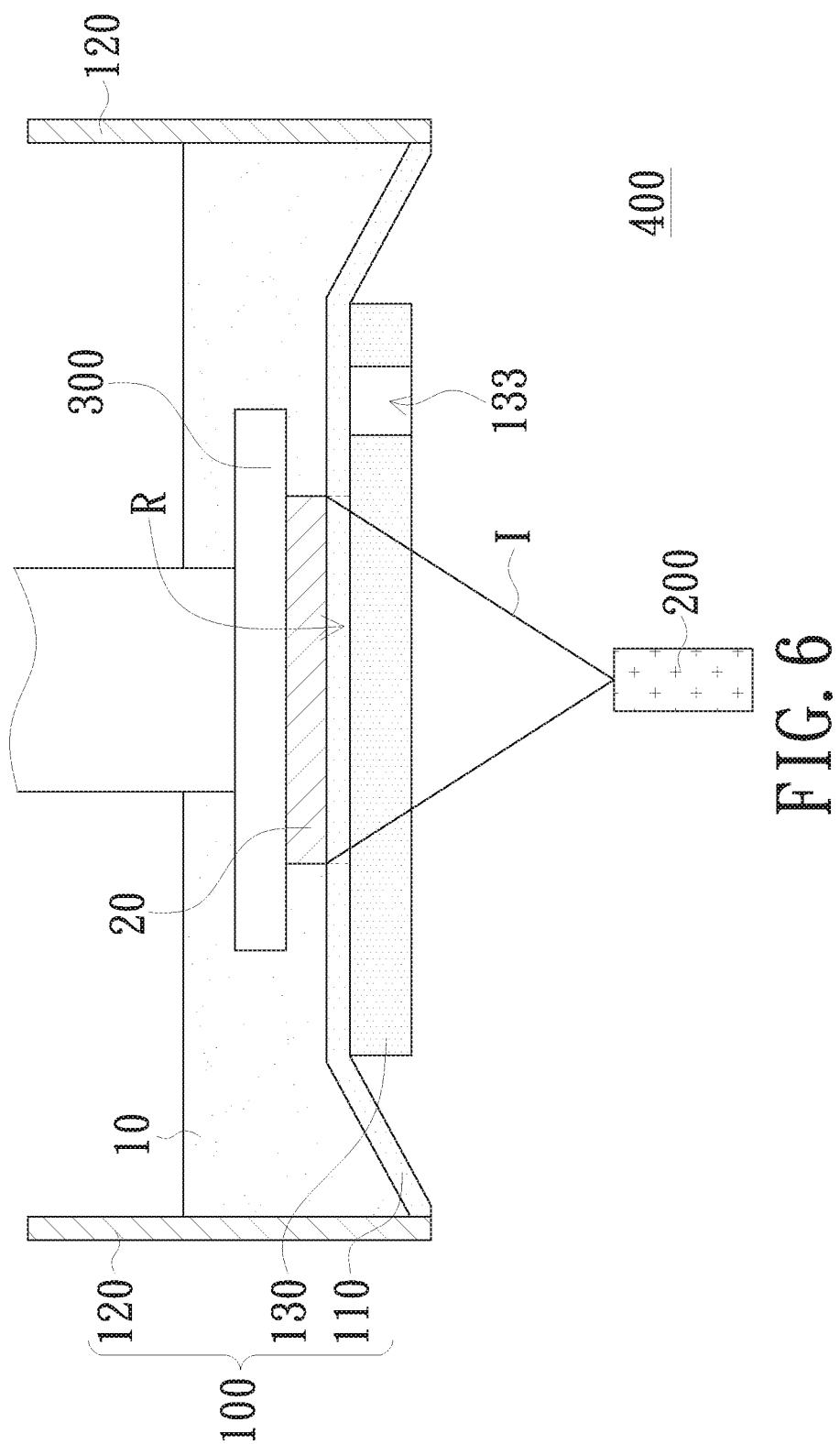
FIG. 6 is a schematic illustration of a three-dimensional printing apparatus according to an embodiment of the present invention.

Referring now to FIG. 6. An embodiment of the present invention provides a three-dimensional printing apparatus 400, which includes a light source device 200, a platform 300, and any one of the liquid tanks of the aforementioned embodiments. It is to be understood that the liquid tank 100 in FIG. 6 is identical to the liquid tank 100 illustrated in FIG. 1. The liquid tank 100 is configured to accommodate the photosensitive liquid 10; the light source device 200 is disposed below the liquid tank 100 for providing a curing light beam I that passes through the plate 130 and irradiates the working area R. The light source device 200 may be, but is not limited to, a digital light processing (DLP) projection device or other types of projection device (e.g. LCOS, LCD). The platform 300 and the plate 130 are disposed on two opposite sides of the film 110 of the liquid tank 100. The platform 300 is configured to move toward and away from the film 110.

Upon irradiation of the photosensitive liquid 10, the workpiece 20 is formed in the working area R and adhered to the platform 300. The platform 300 moves away from the film 110 so that the workpiece 20 is lifted upward and separates from the film 110. During the separation, presence of the fluid tunnel 133 would eliminate the low-pressure/vacuum built between the film 110 and the plate 130 and balance the pressure along the two sides of the film 110. Consequently, the workpiece 20 may be easily separated from the film 110 by applying an uplift force that is greater than only the adhesive force between the workpiece 20 and the film 110, allowing the photosensitive liquid 10 to fill between the workpiece 20 and the film 110 so as to initiate the following printings.

Figure 7:
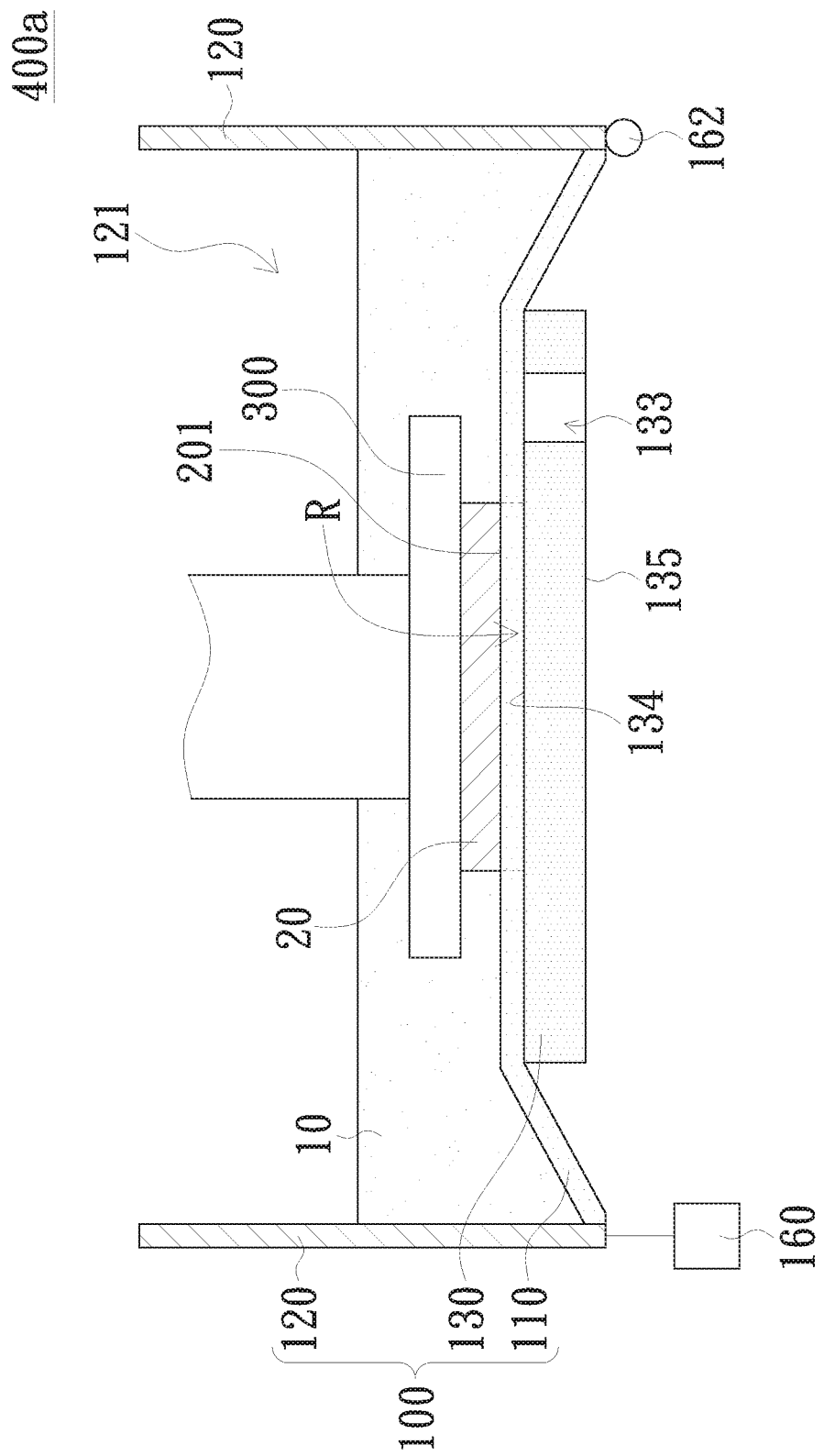
FIG. 7 is a schematic illustration of a three-dimensional printing apparatus according to an embodiment of the present invention.

Referring now to FIG. 7. An embodiment of the present invention provides a three-dimensional printing apparatus 400a, which includes a liquid tank 100 and a motor 160. The liquid tank 100 is configured to accommodate the photosensitive liquid 10, and includes a film 110 and a plate 130. The liquid tank 100 may further include a plurality of side walls 120. The film 110, the side walls 120, and the plate 130 of the present embodiment are structurally similar to those of the aforementioned embodiments as illustrated in FIG. 1 to FIG. 3B; redundant details thereof are thus not repeatedly provided herein. The three-dimensional printing apparatus 400a of the present embodiment is different from the three-dimensional printing apparatus 400 of the aforementioned embodiment mainly in that it uses the motor 160, which is disposed below the film 110, the side walls 120, and the plate 130, and the fluid tunnel 133 of the plate 130, which supports the film 110, together to achieve the purpose of easier separation of the workpiece 20 from the film 110.

In this embodiment, the motor 160 is disposed on one of the side walls 120 cooperating with a pivot 162 on another side wall 120; the present invention is not limited thereto however. In other embodiments of the present invention, the motor 160 and the pivot 162 may be disposed on one of two opposite ends of the plate 130 of the liquid tank 100; a position of the motor 160 is not limited herein however. The motor 160 and the pivot 162 can be disposed on different sides of the side walls 120 in different cases.

Figure 7A:
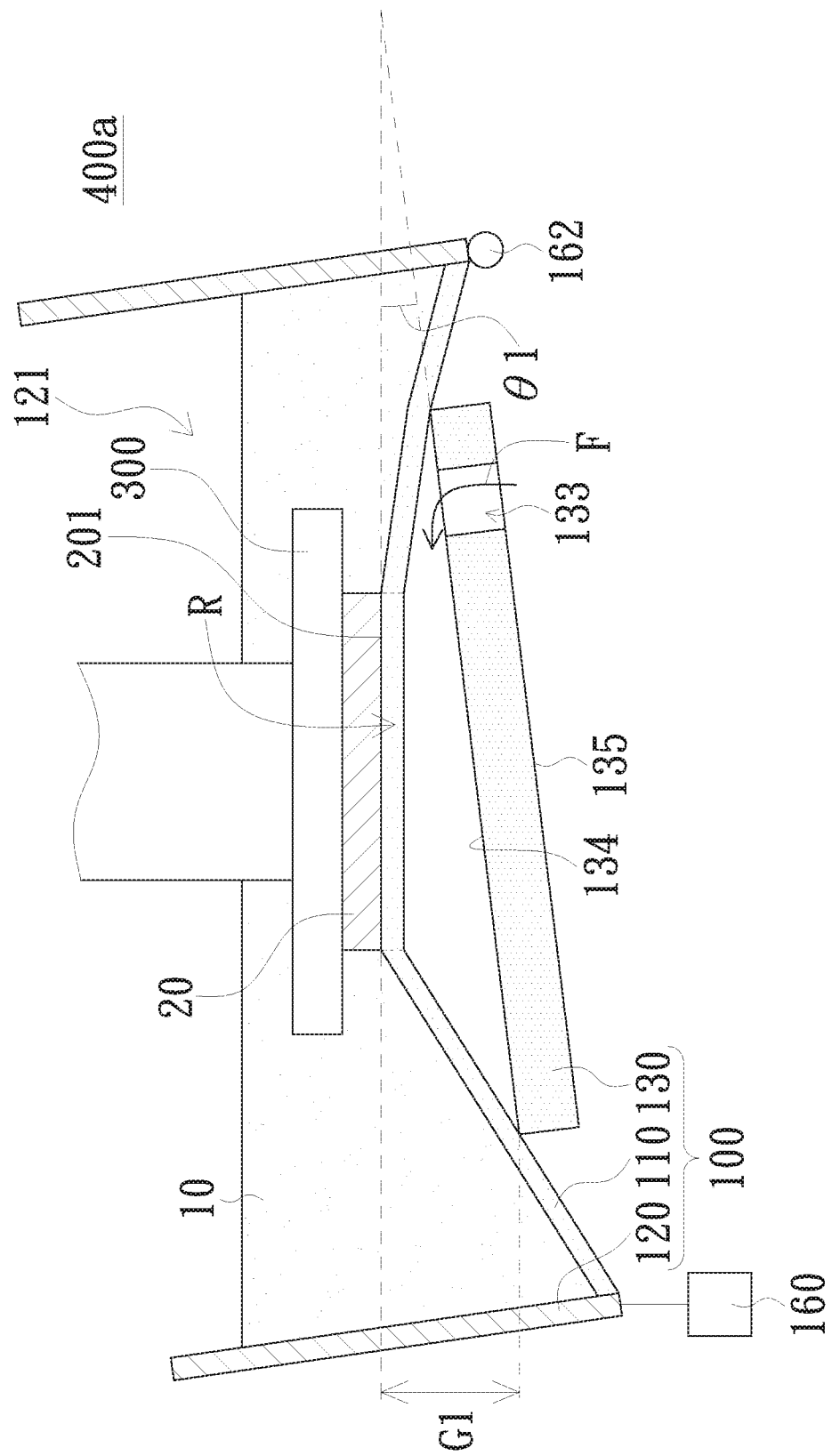
FIG. 7A is a schematic illustration of separation of the film from the plate according to the embodiment illustrated in FIG. 7.
Figure 7B:
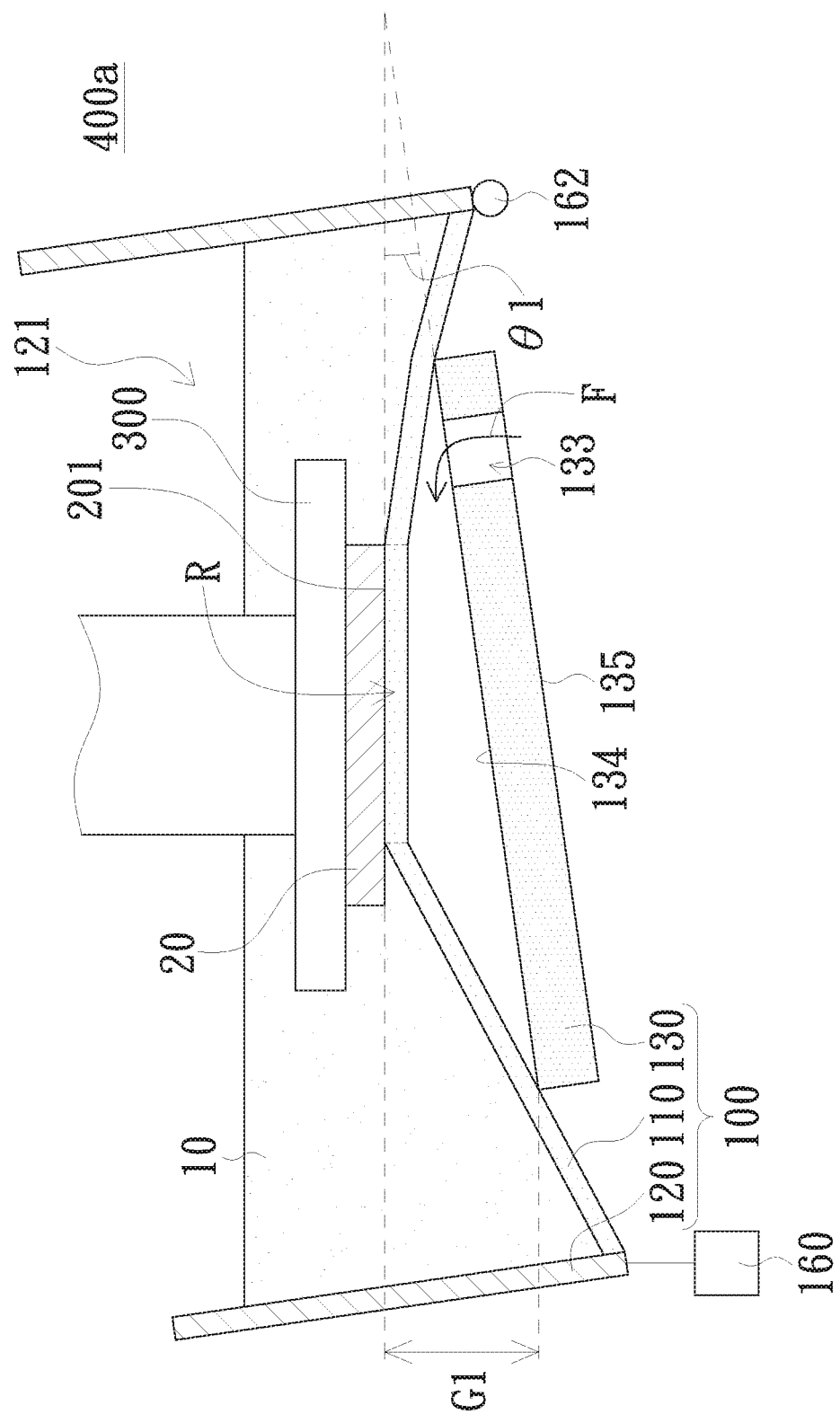
FIG. 7B is a schematic illustration of separation of the workpiece in the liquid tank from the film according to the embodiment illustrated in FIG. 7.

FIG. 7A illustrates separation of the film 110 from the plate 130, and FIG. 7B illustrates separation of the workpiece 20 in the liquid tank 100 from the film 110.

Referring now to FIG. 7A. A photosensitive liquid 10 is cured in a working area R to form the workpiece 20 adhered to a platform 300 of the three-dimensional printing apparatus. Thereafter, dragging-down traction provided by the motor 160 on one of the side walls 120 makes another side wall 120 rotates along the pivot 162. Rotation of the side walls 120 also drives rotation of the plate 130 along the pivot 162. At least a portion of the plate 130 moves away from the film 110 to form an interval G1 between the portion of the plate 130 and the workpiece 20 and make the surface 134 of the plate 130 slant/inclined to an adhesive surface 201, which is the surface of the workpiece 20 adheres to the film 110. An angle θ1 is measured between the surface 134 of the plate 130 and the adhesive surface 201 of the workpiece 20. Thus, it allows fluid F to flow through the fluid tunnel 133 and also peripheral regions of the plate 130 to enter the space between the surface 134 of the plate 130 and the film 110. Consequently, low-pressure/vacuum built up between the film 110 and the plate 130 is eliminated and pressure along the two sides of the film 110 is balanced.

Referring now to FIG. 7B. A shearing component force is formed by the film 110. When the workpiece 20 is uplifted by the platform 300, the shearing component force makes the film 110 gradually separating from the workpiece 20 along the adhesive surface 201, allowing the photosensitive liquid 10 to fill the space between the workpiece 20 and the film 110 so as to initiate printing of the following layer. It is noted that, in the three-dimensional printing apparatus 400a of the present embodiment, separation of the workpiece 20 from the film 110 can be achieved by the motor 160 and presence of the fluid tunnel 133 of the plate 130 together. Consequently, the liquid tank 100 of the present embodiment greatly reduces the uplift force required to separate the workpiece 20 from the film 110. And thus, not just damages of the workpiece 20 or deformation of the film 110 can be avoided, but also effectively reduce time consuming for forming the workpiece 20 by easier and faster separation of the workpiece 20 from the film 110. Product yields of large workpieces can be therefore highly improved.

In the present embodiment, the angle θ1 between the surface 134 of plate 130 and the adhesive surface 201 of the workpiece 20 is in a range of 0-5 degrees; the present invention is not limited thereto however. In another embodiment of the present invention, the angle θ1 is in a range of 0-10 degrees; and in another embodiment of the present invention, the angle θ1 is in a range of 0-30 degrees.

In the present embodiment, the interval G1 between at least a portion of the plate 130 and the workpiece 20 is in a range of 0-15 mm; the present invention is not limited thereto however. In another embodiment of the present invention, the interval G1 between at least a portion of the plate 130 and the workpiece 20 is in a range of 0-20 mm; and in another embodiment of the present invention, the interval G1 between at least a portion of the plate 130 and the workpiece 20 is in a range of 0-30 mm.

The motor 160 of the present embodiment is a stepper motor; the present invention is not limited thereto however. In other embodiments of the present invention, the motor 160 may be other types of motors, such as a voice coil motor, or other devices/elements, such as spring or piezoelectric materials, to accomplish the same function; however, the present invention is not limited thereto. Any devices or elements can make the surface 134 of the plate 130 inclined with respect to the adhesive surface 201 of the workpiece 20 can be applied.

Figure 8:
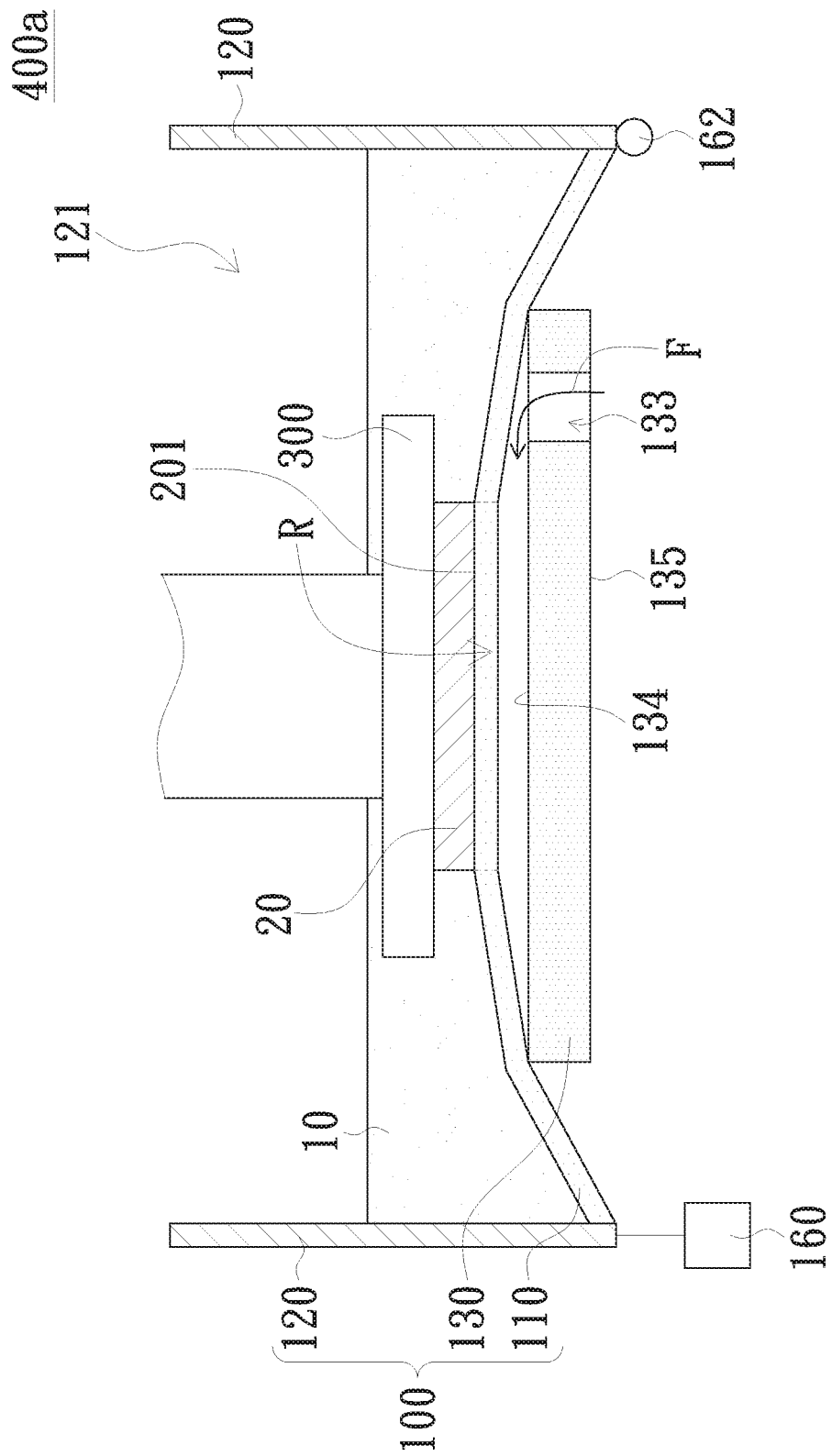
FIG. 8 is a schematic illustration of separation of the film from the plate according to an embodiment of the present invention.

Referring now to FIG. 8, which illustrates separation of a film 110 from a plate 130 according to another embodiment of the present invention. A photosensitive liquid 10 is cured in a working area R to form a workpiece 20 adhered to a platform 300. Thereafter, uplift of the workpiece 20 by the platform 300 allows fluid F to flow through the fluid tunnel 133 and enter a space between the film 110 and a surface 134 of the plate 130, therefore eliminating low-pressure/vacuum built up between the film 110 and the plate 130 and balancing the pressure along the two sides of the film 110.

After separation of the film 110 from the plate 130 by uplift of the workpiece 20 by the platform 300, a motor 160 drags one of the side walls 120 down so as to make another side wall 120 rotating along a pivot 162. Rotation of the side walls 120 also drives rotation of the plate 130 along the pivot 162. The surface 134 of the plate 130 is gradually inclined so as to form an angle θ1 between the surface 134 of the plate 130 and the adhesive surface 201 of the workpiece 20. The workpiece 20 thus separates from the film 110, allowing the photosensitive liquid 10 to fill the space between the workpiece 20 and the film 110 so as to initiate printing of the following layer. Details of the aforementioned movements of dragging down and separation of the workpiece 20 from the film 110 are similar to illustration in FIG. 7A and FIG. 7B.

Figure 9:
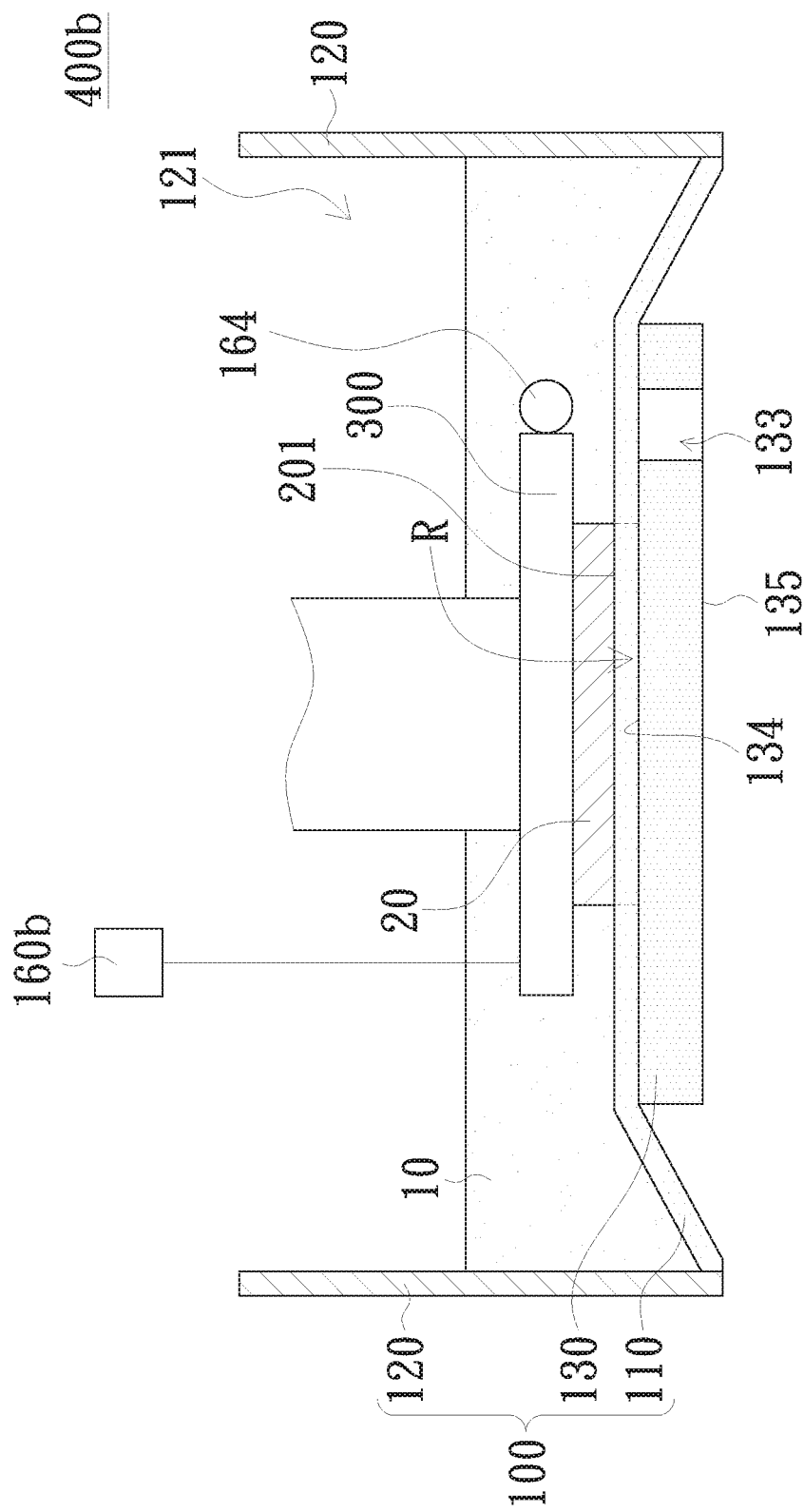
FIG. 9 is a schematic illustration of a three-dimensional printing apparatus according to an embodiment of the present invention.

Referring now to FIG. 9. An embodiment of the present invention provides a three-dimensional printing apparatus 400b, which includes a liquid tank 100 and a motor 160b. The liquid tank 100 is configured to accommodate the photosensitive liquid 10, and includes a film 110 and a plate 130. The liquid tank 100 may further include a plurality of side walls 120. The film 110, the side walls 120, and the plate 130 of the present embodiment are structurally similar to those of the aforementioned embodiments as illustrated in FIG. 1 to FIG. 3B, and redundant details thereof are thus omitted for purpose of brevity. The three-dimensional printing apparatus 400b of the present embodiment is different from the three-dimensional printing apparatus 400a of the aforementioned embodiment mainly in that the motor 160b is disposed on the platform 300. In the present embodiment, the plate 130 is also configured to support the film 110 and includes at least one fluid tunnel 133. Moreover, the present embodiment, similar to aforementioned embodiment, uses the motor 160b and the fluid tunnel 133 of the plate 130 together to achieve the purpose of easier separation of the workpiece 20 from the film 110.

In the present embodiment, the motor 160b is disposed on one end of the platform 300, and a pivot 164 is disposed on an opposite end of the platform 300. However, it is for illustration only but not intended to limit the present invention.

Figure 9A:
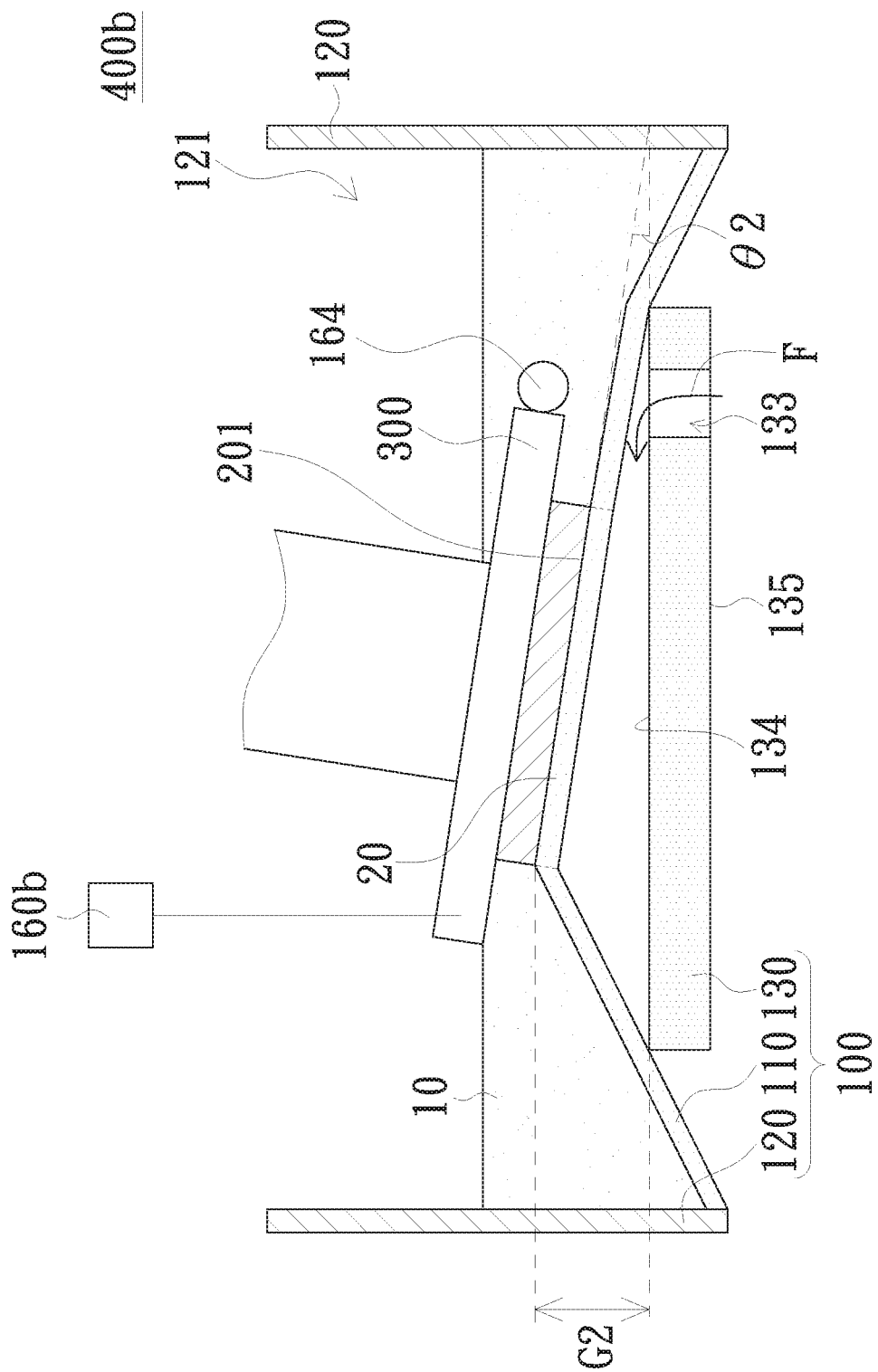
FIG. 9A is a schematic illustration of separation of the film from the plate according to the embodiment illustrated in FIG. 9.
Figure 9B:
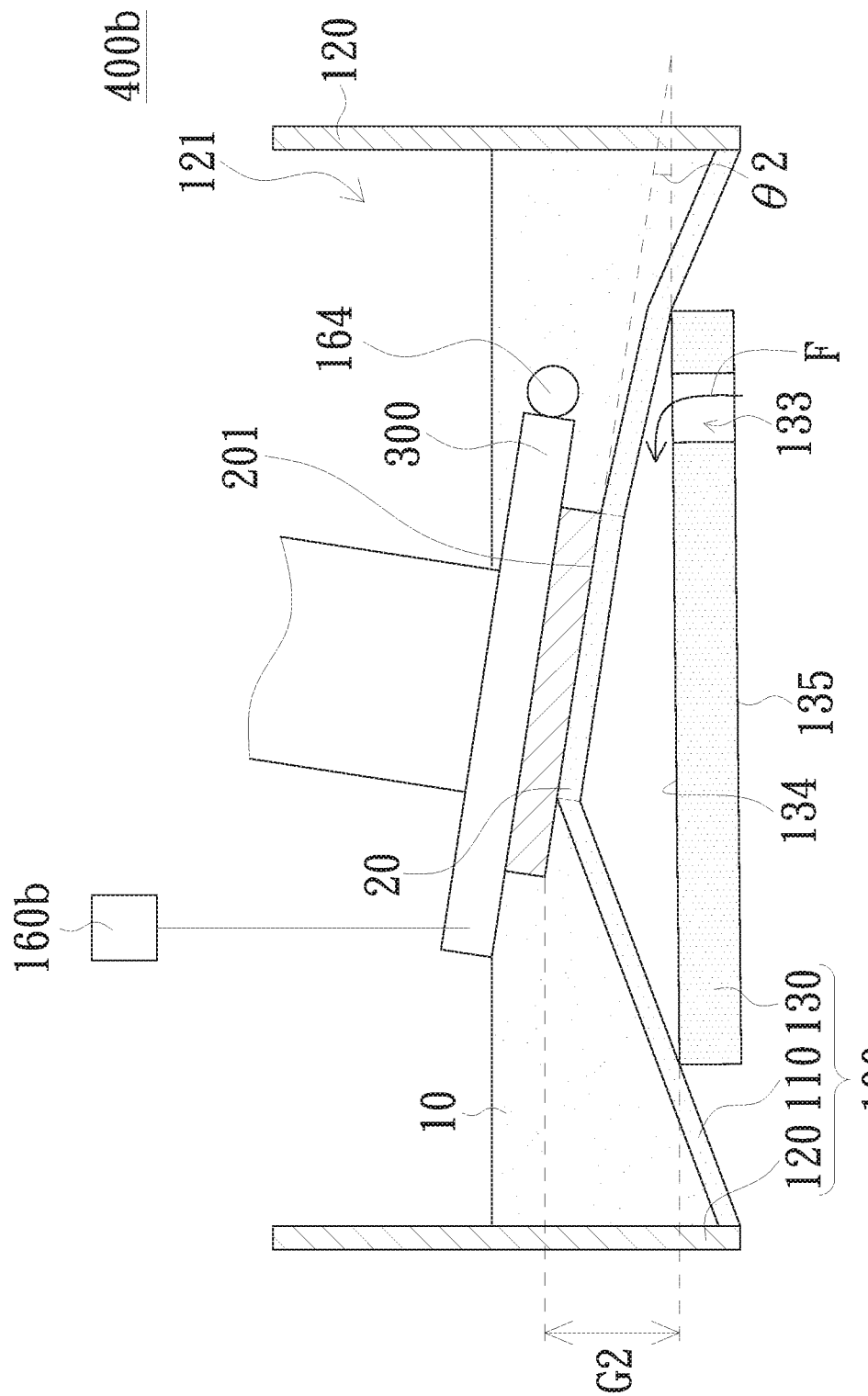
FIG. 9B is a schematic illustration of separation of the workpiece in the liquid tank from the film according to the embodiment illustrated in FIG. 9.

FIG. 9A illustrates separation of the film 110 from the plate 130, and FIG. 9B illustrates separation of the workpiece 20 from the film 110 in the liquid tank 100.

Referring now to FIG. 9A, a photosensitive liquid 10 is cured in a working area R to form the workpiece 20 adhered to a platform 300. Thereafter, pull-up traction provided by the motor 160b on the end of the platform 300 makes the opposite end of the platform 300 rotates along the pivot 164 so as to drive rotation of the entire platform 300. At least a portion of the platform 300 shifts away from the film 110 to form an interval G2 between the portion of the platform 300 and the workpiece 20 and make a surface 134 of the plate 130 inclined with respect to an adhesive surface 201 of the workpiece 20. An angle θ2 is measured between the surface 134 of the plate 130 and the adhesive surface 201 of the workpiece 20. Thus, it allows fluid F to flow through the fluid tunnel 133 and also peripheral regions of the plate 130 to enter the space between the surface 134 of the plate 130 and the film 110. Consequently, low-pressure/vacuum built up between the film 110 and the plate 130 is eliminated and pressure along the two sides of the film 110 is balanced.

Referring now to FIG. 9B. A shearing component force is formed by the film 110. When the workpiece 20 is uplifted by the platform 300, the shearing component force makes the film 110 gradually separating from the workpiece 20 along the adhesive surface 201, allowing the photosensitive liquid 10 to fill between the workpiece 20 and the film 110 so as to initiate printing of the following layer. It is noted that, in the three-dimensional printing apparatus 400b of the present embodiment, separation of the workpiece 20 from the film 110 can be achieved by the motor 160 and presence of the fluid tunnel 133 of the plate 130 together. Consequently, the liquid tank 100 of the present embodiment greatly reduces the uplift force required to separate the workpiece 20 from the film 110. And thus, not just damage of the workpiece 20 or deformation of the film 110 can be avoided, but also time consumption for forming the workpiece 20 can be effectively reduced by easier and faster separation of the workpiece 20 from the film 110. Product yields of large workpieces can be therefore highly improved.

In the present embodiment, the angle θ2 between the surface 134 of plate 130 and the adhesive surface 201 of the workpiece 20 is in a range of 0-5 degrees; the present invention is not limited thereto however. In another embodiment of the present invention, the angle θ2 is in a range of 0-10 degrees; and in another embodiment of the present invention, the angle θ2 is in a range of 0-30 degrees.

In the present embodiment, the interval G2 between at least a portion of the plate 130 and the workpiece 20 is in a range of 0-15 mm; the present invention is not limited thereto however. In another embodiment of the present invention, the interval G2 is in a range of 0-20 mm; and in another embodiment of the present invention, the interval G2 is in a range of 0-30 mm.

The motor 160b of the present embodiment is a stepper motor; the present invention is not limited thereto however. In other embodiments of the present invention, the motor 160b may be other types of motors, such as a voice coil motor, or other devices/elements, such as spring or piezoelectric materials, to accomplish the same function; however, the present invention is not limited thereto. Any devices or elements can make the surface 134 of the plate 130 inclined with respect to the adhesive surface 201 of the workpiece 20 can be applied.

Figure 10:
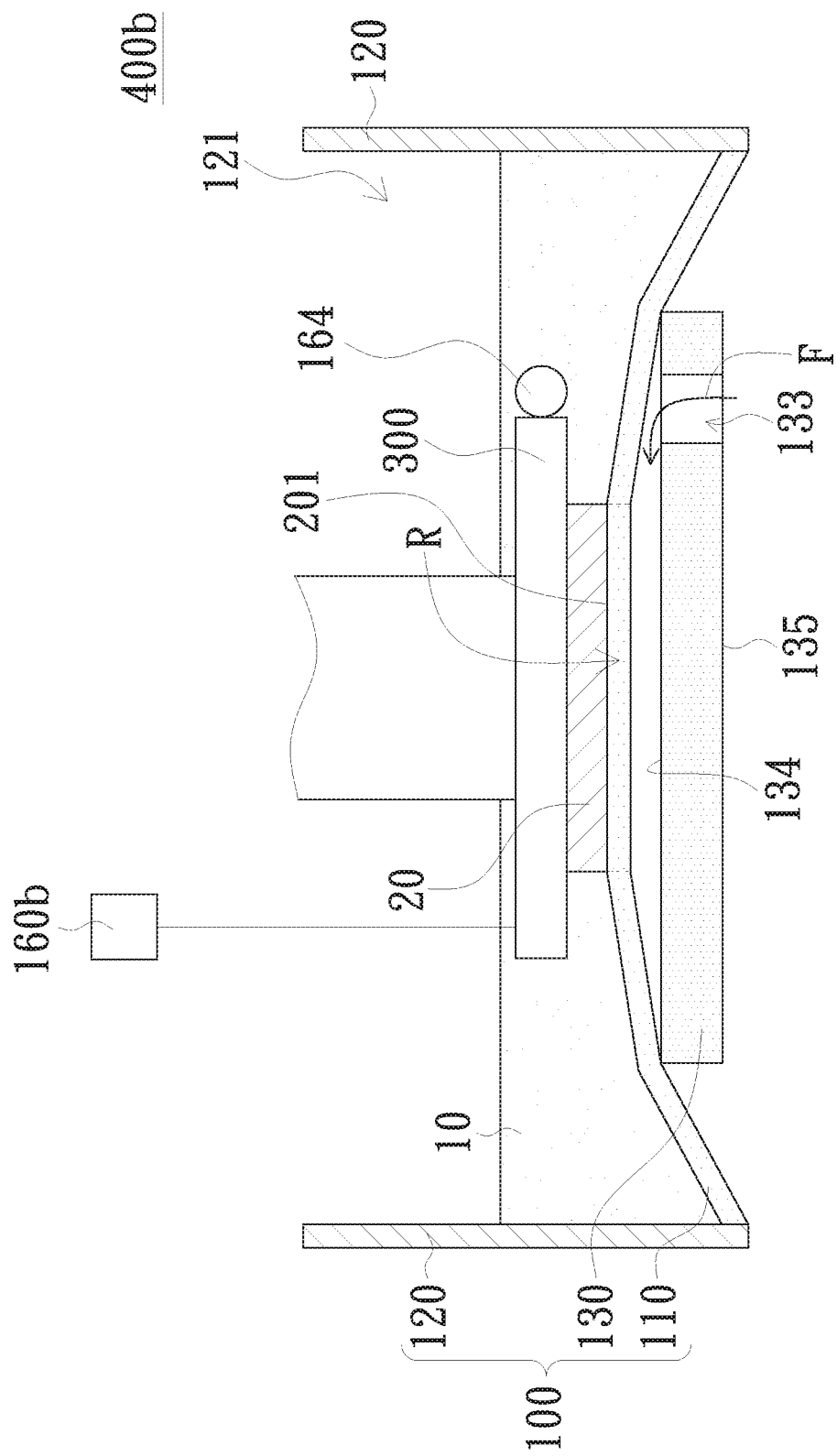
FIG. 10 is a schematic illustration of separation of the film from the plate according to an embodiment of the present invention.

Referring now to FIG. 10, which illustrates separation of a film 110 from a plate 130 according to another embodiment of the present invention. A photosensitive liquid 10 is cured in a working area R to form a workpiece 20 adhered to a platform 300. Thereafter, uplift of the workpiece 20 by the platform 300 allows fluid F to flow through the fluid tunnel 133 and enter a space between the film 110 and a surface 134 of the plate 130, therefore eliminating low-pressure/vacuum built up between the film 110 and the plate 130 and balancing the pressure along the two sides of the film 110.

After separation of the film 110 from the plate 130 by uplift of the workpiece 20 by the platform 300, a motor 160 pulls one end of the platform 300 upon so as to make another end of the platform 300 rotating along a pivot 164 so as to drive rotation of the entire platform 300. An adhesive surface 201 of the workpiece 20 adhered on the platform 300 is gradually inclined so as to form an angle θ2 between the surface 134 of the plate 130 and the adhesive surface 201 of the workpiece 20. The workpiece 20 thus separates from the film 110, allowing the photosensitive liquid 10 to fill the space between the workpiece 20 and the film 110 so as to initiate printing of the following layer. Details of the aforementioned movements of pulling up and separation of the workpiece 20 from the film 110 are similar to illustration in FIG. 9A and FIG. 9B.

It is important to note that the three-dimensional printing apparatus 400a as illustrated in FIG. 7 to FIG. 8 and the three-dimensional printing apparatus 400b as illustrated in FIG. 9 to FIG. 10 are able to be adopted in the framework of the three-dimensional printing apparatus 400 as illustrated in FIG. 6.

An embodiment of the present invention provides a three-dimensional printing method for eliminating a low-pressure area built between the film and the plate for supporting the film during printing. The method includes gradually directing a fluid to flow from a portion of the low-pressure area to fill the entire low-pressure area. More specifically, the fluid tunnel 133 as illustrated in FIG. 2A may be adopted to direct the fluid F to flow from the portion of the low-pressure area connecting to the fluid tunnel 133 to gradually fill the entire low-pressure area. Additionally or alternatively, at least one lifting device 150 may be disposed adjacent to the plate 130c to lift the film 110 by propping against the surface 112 of the film 110, so as to direct the fluid F to flow from the edge of the low-pressure/vacuum area to gradually fill the entire low-pressure area. Moreover, the motor 160, disposed on the side wall 120 (or the plate 130) as illustrated in FIG. 7, or the motor 160b, disposed on the platform 300 as illustrate in FIG. 9, is optionally included to facilitate separation of the workpiece 20 from the film 110.

The aforementioned embodiments utilize the fluid tunnel(s), the lifting device(s), or motor(s) to eliminate the low-pressure/vacuum built between the film and the plate, therefore effectively reducing the uplift force required to release workpieces and avoiding workpiece damages and film deformation, as well as improving the speed and stability of three-dimensional printing. The present invention thus also provides better product yields of large workpiece.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional printing apparatus, comprising:
  a liquid tank, capable of accommodating a photosensitive liquid, the liquid tank comprising:
    a film, disposed in the bottom of the liquid tank and having a workpiece curing area;
    a plurality of side walls, surrounding the film; and
    a plate, disposed under the film and capable of supporting the film, and the plate having at least one fluid tunnel extending from a first surface of the plate contacting the film to a second surface of the plate, wherein the plate is not flexible; and
  a motor, connected to the liquid tank to incline the liquid tank;
  wherein a gap is formed between the plate and one of the plurality of side walls of the liquid tank, the film is capable of communicating with an outside space via the gap, and, during separation of a cured workpiece from the film, a lowest point of the film is lower than a lowest point of the plate.

2. The three-dimensional printing apparatus according to claim 1, further comprising:
  a pivot, disposed on one end of the plate, with the motor disposed on an opposite end of the plate, being as a rotation center of the liquid tank when the motor is inclining the liquid tank.

3. The three-dimensional printing apparatus according to claim 1, wherein the motor inclines the first surface of the plate of the liquid tank with respect to an adhesive surface of a workpiece.

4. The three-dimensional printing apparatus according to claim 1, wherein the motor inclines the liquid tank to form an angle between the first surface of the plate and an adhesive surface of a workpiece in one of the following ranges: 0-30 degrees, 0-10 degrees, and 0-5 degrees.

5. The three-dimensional printing apparatus according to claim 1, wherein the motor inclines the liquid tank to form an interval between a portion of the plate and a workpiece in one of the following ranges: 0-30 mm, 0-20 mm, and 0-15 mm.

6. The three-dimensional printing apparatus according to claim 1, further comprising:
  a platform, disposed on a first side of the film of the liquid tank, with the plate disposed on a second side of the film of the liquid tank opposite to the first side, wherein the platform is configured to move toward and away from the film, and
  a light source, disposed at the second side of the liquid tank, for providing a curing light beam to the liquid tank.

7. The three-dimensional printing apparatus according to claim 1, wherein the plate is in contact with the film during separation of the cured workpiece from the film.

8. The three-dimensional printing apparatus according to claim 7, further comprising:
  a pivot, disposed on another one of the plurality of side walls, being as a rotation center of the liquid tank when the motor is inclining the liquid tank.

9. The three-dimensional printing apparatus according to claim 1, wherein the plate has a first area corresponding to the workpiece curing area and a second area adjacent to the first area, and the fluid tunnel is in the second area.

10. The three-dimensional printing apparatus according to claim 9, wherein the film further has an outer area surrounding the workpiece curing area and corresponding to the second area of the plate.

11. A three-dimensional printing apparatus, comprising:
  a liquid tank, having an opening and capable of accommodating a photosensitive liquid, the liquid tank comprising:
    a film, disposed in the bottom of the liquid tank and covering entire of the opening of the liquid tank and having a central area comprising a workpiece curing area and an outer area surrounding the central area; and
    a plate, disposed under the film and capable of supporting the film and having at least one fluid tunnel extending from a first surface of the plate contacting the film to a second surface of the plate, wherein, during separation of a cured workpiece from the film, a lowest point of the film is lower than a lowest point of the plate;
  a motor, connected to the liquid tank to incline the liquid tank; and a light source device, disposed below the liquid tank and capable of providing a curing light beam passing through the plate and irradiating the workpiece curing area.

12. The three-dimensional printing apparatus according to claim 11, further comprising:
a pivot, disposed on the liquid tank, being as a rotation center of the liquid tank when the motor is inclining the liquid tank.

13. The three-dimensional printing apparatus according to claim 11, wherein the motor inclines the first surface of the plate of the liquid tank with respect to an adhesive surface of a workpiece.

14. The three-dimensional printing apparatus according to claim 11, wherein the motor inclines the liquid tank to form an angle between the first surface of the plate and an adhesive surface of a workpiece in one of the following ranges: 0-30 degrees, 0-10 degrees, and 0-5 degrees.

15. The three-dimensional printing apparatus according to claim 11, wherein the motor inclines the liquid tank to form an interval between a portion of the plate and a workpiece in one of the following ranges: 0-30 mm, 0-20 mm, and 0-15 mm.

16. The three-dimensional printing apparatus according to claim 11, wherein the plate has a first area corresponding to the workpiece curing area and a second area adjacent to the first area, and the fluid tunnel is in the second area.

17. The three-dimensional printing apparatus according to claim 11, further comprising:
a platform, disposed on a first side of the film of the liquid tank, with the plate disposed on a second side of the film of the liquid tank opposite to the first side, wherein the platform is configured to move toward and away from the film.

18. The three-dimensional printing apparatus according to claim 11, wherein the liquid tank further comprises a plurality of side walls surrounding the opening.

19. The three-dimensional printing apparatus according to claim 18, wherein a gap is formed between the plate and one of the side walls of the liquid tank.

20. The three-dimensional printing apparatus according to claim 18, wherein the motor is disposed on one of the plurality of side walls.

* * * * *